(12) United States Patent
Chowdhury

(10) Patent No.: US 6,925,883 B2
(45) Date of Patent: Aug. 9, 2005

(54) NON RESONATING CLOSE COUPLED PROBE

(75) Inventor: Subhradeep Chowdhury, Rocky Hill, CT (US)

(73) Assignee: United Technologies Corporation, Hartford, CT (US)

(*) Notice: Subject to any disclaimer, the term of this patent is extended or adjusted under 35 U.S.C. 154(b) by 6 days.

(21) Appl. No.: 10/652,641

(22) Filed: Aug. 28, 2003

(65) Prior Publication Data

US 2005/0044958 A1 Mar. 3, 2005

(51) Int. Cl.⁷ .................................................. G01L 7/00
(52) U.S. Cl. ........................................ 73/714; 73/116
(58) Field of Search ............................. 73/866.5, 116, 73/430; 60/772

(56) References Cited

U.S. PATENT DOCUMENTS

| 3,893,451 | A | | 7/1975 | Durand et al. |
| 4,271,859 | A | * | 6/1981 | Lawsing ........................ 137/85 |
| 5,174,156 | A | | 12/1992 | Johnson et al. |
| 5,185,996 | A | * | 2/1993 | Smith et al. ................... 60/772 |
| 5,239,866 | A | * | 8/1993 | Froidevaux ................... 73/430 |
| 6,272,930 | B1 | | 8/2001 | Crozafon et al. |
| 2004/0134284 | A1 | * | 7/2004 | Gleeson et al. ............... 73/756 |
| 2004/0154385 | A1 | * | 8/2004 | Acker .......................... 73/116 |

FOREIGN PATENT DOCUMENTS

| GB | 1 469 888 | 4/1977 |
| GB | 2 037 993 A | 7/1980 |

\* cited by examiner

Primary Examiner—William Oen
Assistant Examiner—Andre Allen
(74) Attorney, Agent, or Firm—Bachman & LaPointe, P.C.

(57) ABSTRACT

A probe includes a first tube having a first end positioned at a measurement location, and a second end; a second tube having a first end, and a second end; a connector having a transducer for connecting the second end of the first tube to the second end of the second tube; and a terminating element attached to the first end of the second tube, wherein the second tube is of a length sufficient to substantially eliminate the incidence of resonance.

20 Claims, 1 Drawing Sheet

NON RESONATING CLOSE COUPLED PROBE

BACKGROUND OF THE INVENTION (1) Field of the Invention

The present invention relates to a non-resonating probe for measuring pressure. More particularly, the present invention relates to a probe for measuring absolute and dynamic pressure in high temperature environments which reduces the incidence of corrupting wave pressure resonance.

(2) Description of the Related Art

Pressure transducers are used in the art to measure pressure readings. Often times, the pressure transducers must measure high response pressure in harsh temperature and pressure environments, such as that of an operating gas turbine engine. Unfortunately, pressure transducers are not able to maintain consistent measuring characteristics in high temperature environments. The requirement to cool such transducers results in a displacement of the transducer away from the source of pressure and requires the use of a tube to bring pressure to the transducer.

The dislocation of the transducer away from the source of pressure often times leads to additional dynamics, or resonances, in the tube which may affect the measurement. While using a long tube to measure the pressure and placing the transducer in a thermally stable environment may improve accuracy, transient dynamic measurements are sacrificed when using such a set up.

What is therefore needed is an apparatus, which incorporates a high temperature transducer capable of measuring the pressure response present in high temperature and pressure environments, which does not suffer from the presence of resonances.

SUMMARY OF THE INVENTION

Accordingly, it is an object of the present invention to provide a non-resonating close coupled probe for measuring pressure. More particularly, the present invention relates to a probe for measuring pressure in high temperature environments which reduces the incidence of corrupting wave pressure resonance.

It is a further object of the present invention to provide a probe which comprises a first tube comprising a first end positioned at a measurement location, a second end, and an inner and outer diameter, a second tube comprising a first end, a second end, an inner diameter, and an outer diameter, a connector comprising a transducer for connecting the second end of the first tube to the second end of the second tube, and a terminating element attached to the first end of the second tube wherein the second tube is of a length sufficient to substantially eliminate the incidence of resonance.

It is a further object of the present invention to provide the aforementioned probe wherein the first sensor takes dynamic measurements and said second sensor takes static state measurements.

BRIEF DESCRIPTION OF THE DRAWINGS

The FIGURE is an illustration of one embodiment of the close coupled probe of the present invention.

DETAILED DESCRIPTION

Figure 1:
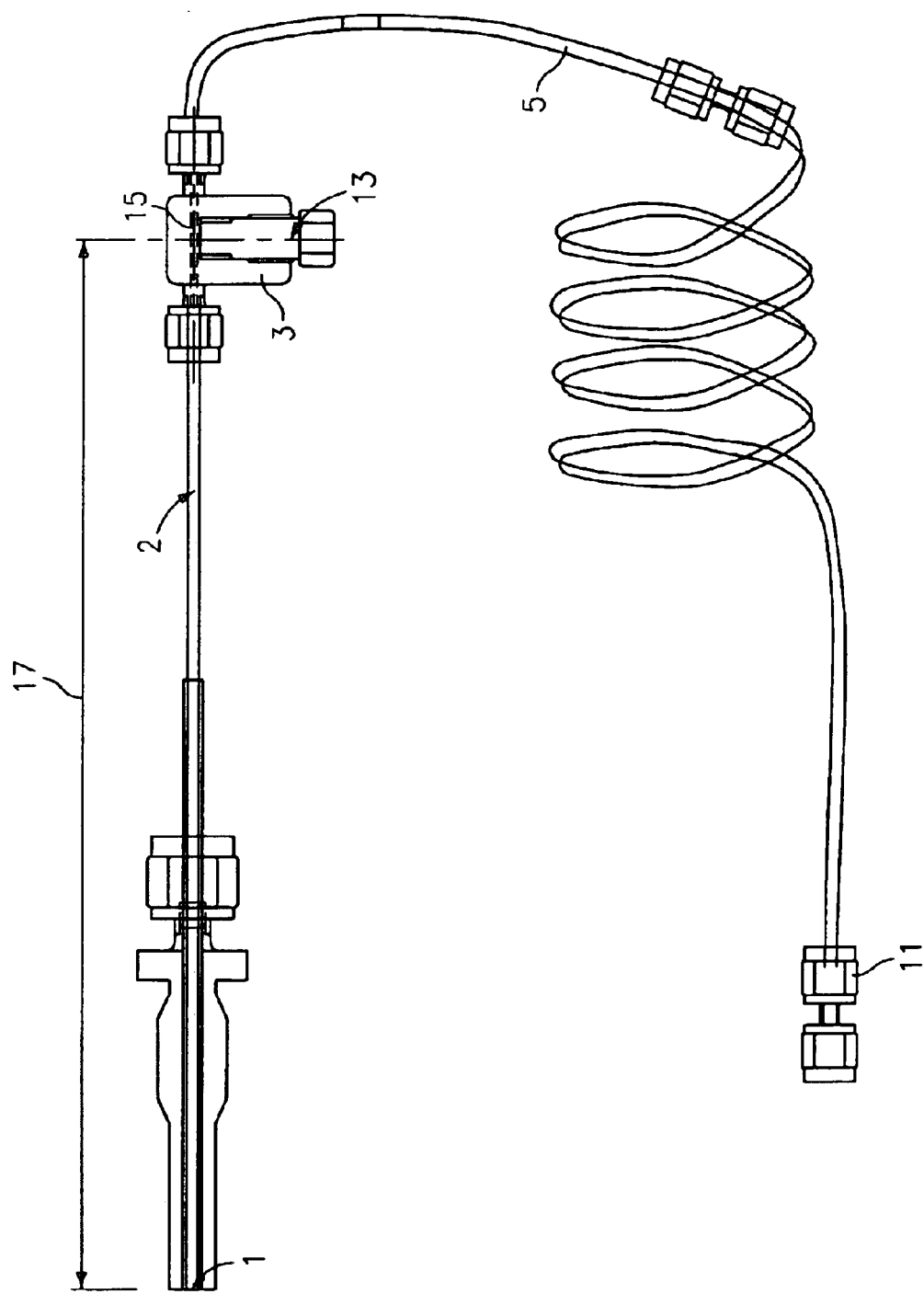

The embodiment of the present invention shown in the FIGURE is a probe capable of taking pressure measurements in a high temperature and pressure environment, but which minimizes the affects introduced by resonance of the pressure waves in the probe apparatus. This is accomplished by inserting a pressure transducer in between a short tube and a much longer tube. A short tube functions at one end to contact the location where the pressure measurement is to be made, and at the other end to connect to the pressure transducer. The pressure transducer is likewise attached to another much longer tube with an inner diameter identical in its dimensions to that of the first shorter tube. Furthermore, the transducer is mounted in a connector which provides a pathway between the two tubes whereby the pathway is of an identical diameter as the two tubes. It is the added extension of the second much longer tube which serves to reduce, or entirely eliminate, pressure resonances in the tube structure. As a result, the pressure transducer of the present invention is able to measure pressure at a point near the measuring position absent the corrupting influences of pressure pulsation.

With reference to the FIGURE there is illustrated in detail one embodiment of the probe apparatus of the present invention. The first tube 2, preferably a hypo-tube, terminates at one end at measuring location 1 and at another end at a connector 3 enclosing a pressure transducer 13. As used herein, a "hypo-tube" refers to a tube, usually fabricated from steel, utilized for hypodermic purposes. In a preferred embodiment, connector 3 comprises a T-fitting. As configured, one end of first tube 2 terminates near measuring location 1 which is directed to a place where pressure readings are to be made. Similarly, another end of first tube 2 terminates in the pressure transducer 13 at one end of connector 3. In a preferred embodiment the first tube 2 is between three and thirty six inches. Most preferably, the first tube 2 is between six and twelve inches. In all configurations, first tube 2 is of a length short enough to allow the measurement of transient dynamics. Connector 3 comprises a pathway 15 which extends across connector 3. It is of great importance that the diameter of the pathway be equivalent to the inner diameter of first tube 2. Attached to the other end of the connector 3 is one end of second tube 5. Second tube 5 has an inner diameter identical to that of first tube 2 and pathway 15. A second end of second tube 5 terminates at a terminating element 11. Pressure fluctuations travel from measuring location 1 towards the terminating element 11 via first tube 2, pathway 15, and second tube 5 while experiencing no abrupt change in the diameter.

The pressure transducer 13 is preferably constructed such that it makes pressure readings substantially flush with the pathway 15. Preferably, pressure transducer 13 is a high temperature transducer with temperature compensation and correction features built in. In order to increase accuracy, the connector 3 may have applied to it cooling air or water in order to maintain a stable thermal environment. Cool air may be blown steady over the transducer 13 and connector 3 to try and maintain a stable thermal environment. Tubes flowing cool water may also be wrapped around the connector 3 to keep it thermally stable through conduction.

Second tube 5 is a long tube, preferably a hypo-tube, extending from one side of the connector 3 opposite the side wherein first tube 2 enters connector 3. Second tube 5 is substantially longer than first tube 2. In a preferred embodiment, second tube 5 extends for a minimum of 40 feet. It is the presence of the long hypo-tube 5 that facilitates the reduction in pulsation resonance. As dynamic pressure waves enter at the measuring location and proceed down first tube 2 towards second tube 5, frictional forces cause the dynamic pressure waves to diminish in magnitude. As a consequence, there are no abrupt pressure reflections and no apparent resonances can be sustained within the apparatus of the present invention. Preferably, the length of second tube 5 is chosen to be sufficient to reduce or eliminate pulsation resonance. In a preferred embodiment, the ratio of the length of the second tube to the length of the first tube is preferably between 180:1 and 13:1.

Second tube 5 terminates at a terminating element 11. Terminating element 11 may either be a cap to close the second tube 5 or it may be an accurate pressure transducer for making steady pressure measurements such as a steady state data system. One example of such an accurate system would be a scanning valve transducer. Measurements taken at terminating element 11 may in practice be slow but are usually more accurate as they may be place in an isolated and thermally stable environment.

As a result of the configuration of the aforementioned embodiment of the probe of the present invention, it is possible to make transducer pressure measurements requiring accurate, absolute pressure during fast transient changes in pressure. Similarly high speed dynamic pressure measurements, which require high frequency measurements of pressure oscillations and acoustic waves, may be made as well. Lastly the probe of the present invention provides the ability to measure an accurate, steady state pressure in a thermally stable environment without requiring additional intrusions into the measuring environment.

It is apparent that there has been provided in accordance with the present invention a probe for measuring absolute and dynamic pressure in high temperature environments which reduces the incidence of corrupting wave pressure resonance which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A probe, comprising:
   a first tube comprising
      a first end positioned at a measurement location, and a second end;
   a second tube comprising a first end, and a second end;
   a connector comprising a transducer for connecting said second end of said first tube to said second end of said second tube; and
   a terminating element attached to said first end of said second tube wherein said second tube is of a length sufficient to substantially eliminate the incidence of resonance.

2. The probe of claim 1, wherein a ratio of the length of said second tube to the length of said first tube is between 180:1 and 13:1.

3. The probe of claim 1, wherein said first tube comprises a length between three and thirty six inches.

4. The probe of claim 3, wherein said first tube comprises a length between six and twelve inches.

5. The probe of claim 1, wherein an inner diameter of said first tube is equivalent to an inner diameter of said second tube.

6. The probe claim 5, wherein said connector comprises a pathway of a diameter equal to said inner diameter of said first tube.

7. The probe of claim 1, wherein said transducer is a high temperature transducer.

8. The probe of claim 1, wherein said terminating element is selected from the group consisting of a cap and a steady state data system.

9. The probe of claim 8, wherein said steady state data system consists of a system selected from the group consisting of an accurate transducer and a scanning valve transducer.

10. The probe of claim 1, wherein said first tube and said second tube comprise hypo-tubes.

11. The probe of claim 1, wherein said first tube is of a length sufficient to allow for a measurement of transient absolute and dynamic pressure.

12. A probe assembly, comprising:
    a first tube;
    a second tube; and
    a first sensor between said first and second tubes, wherein said second tube has a length selected to limit reflections or resonance within said second tube.

13. The probe of claim 12, wherein said first tube has a length selected to allow said first sensor to measure transient dynamics within said first tube.

14. The probe of claim 13, wherein said length of said first tube is between three and thirty six inches.

15. The probe of claim 14, wherein said length of said first tube is between six and twelve inches.

16. The probe of claim 15, wherein said length of said second tube is at least forty feet.

17. The probe of claim 12, wherein said first sensor is cooled.

18. The probe of claim 12, wherein said first sensor is a pressure transducer.

19. The probe of claim 12, further comprising a second sensor secured to said second tube.

20. The probe of claim 19, wherein said first sensor takes dynamic measurements and said second sensor takes static state measurements.

* * * * *